US012354792B2

(12) United States Patent
Valleau et al.

(10) Patent No.: US 12,354,792 B2
(45) Date of Patent: Jul. 8, 2025

(54) MAGNET STRUCTURE WITH IMPROVED PERFORMANCE, INVERTER, AND ASSOCIATED METHOD

(71) Applicant: SYNCHROTRON SOLEIL, Saint-Aubin (FR)

(72) Inventors: Mathieu Valleau, Gif-sur-Yvette (FR); Amin Ghaith, Dresden (DE); Marie-Emmanuelle Couprie, Paris (FR)

(73) Assignee: SYNCHROTRON SOLEIL, Saint-Aubin (FR)

( * ) Notice: Subject to any disclaimer, the term of this patent is extended or adjusted under 35 U.S.C. 154(b) by 0 days.

(21) Appl. No.: 18/717,871

(22) PCT Filed: Jun. 13, 2023

(86) PCT No.: PCT/EP2023/065735
§ 371 (c)(1),
(2) Date: Jun. 7, 2024

(87) PCT Pub. No.: WO2023/242162
PCT Pub. Date: Dec. 21, 2023

(65) Prior Publication Data

US 2025/0104896 A1 Mar. 27, 2025

(30) Foreign Application Priority Data

Jun. 14, 2022 (FR) ....................................... 2205787

(51) Int. Cl.
*H01F 7/02* (2006.01)
*H05H 7/04* (2006.01)

(52) U.S. Cl.
CPC ............... *H01F 7/021* (2013.01); *H05H 7/04* (2013.01); *H05H 2007/041* (2013.01)

(58) Field of Classification Search
CPC ..... H01F 7/021; H05H 7/04; H05H 2007/041
See application file for complete search history.

(56) References Cited

U.S. PATENT DOCUMENTS

| | | | | |
|---|---|---|---|---|
| 5,383,049 | A | 1/1995 | Carr | |
| 5,420,556 | A * | 5/1995 | Okazaki | H01F 7/0284 335/212 |
| 2012/0256715 | A1* | 10/2012 | Fullerton | H01F 7/02 335/285 |

OTHER PUBLICATIONS

International Search Report and Written Opinion received for PCT/EP2023/065735, mailed Oct. 6, 2023. (Translator Declaration included).

(Continued)

*Primary Examiner* — Mohamad A Musleh
(74) *Attorney, Agent, or Firm* — Greer, Burns & Crain, Ltd

(57) ABSTRACT

A magnet structure including sets of permanent magnets installed periodically in a direction S with a spatial period $\lambda_u$, each set including a magnet of each of a first beam, a second beam, a third beam, and a fourth beam, the magnets of each beam being arranged in succession in the direction S, the first beam and the second beam being arranged in succession in a direction Z, the fourth beam and the third beam being arranged in succession in the direction Z, the third beam and the second beam being arranged in succession in a direction X, and the fourth beam and the first beam being arranged in succession in the direction X, wherein, for at least four successive sets of magnets with a spatial period $\lambda_u$, the magnetization vector of each magnet of each beam has a non-zero component in each of the directions X, S and Z.

21 Claims, 11 Drawing Sheets

(56) References Cited

OTHER PUBLICATIONS

Liang X., et al., "Analysis of the first magnetic results of the PSI APPLE X undulators in elliptical polarisation," Nuclear Instruments & Methods in Physics Research, Section A, vol. 987, Oct. 16, 2020, 10 pages.
Sasaki, S., et al., "Design of a New Type of Planar Undulator for Generating Variably Polarized Radiation," Nuclear Instruments & Methods in Physics Research, Section A, vol. 331, No. 1, Jul. 1, 1993, pp. 763-767.

* cited by examiner

[Fig. 1]
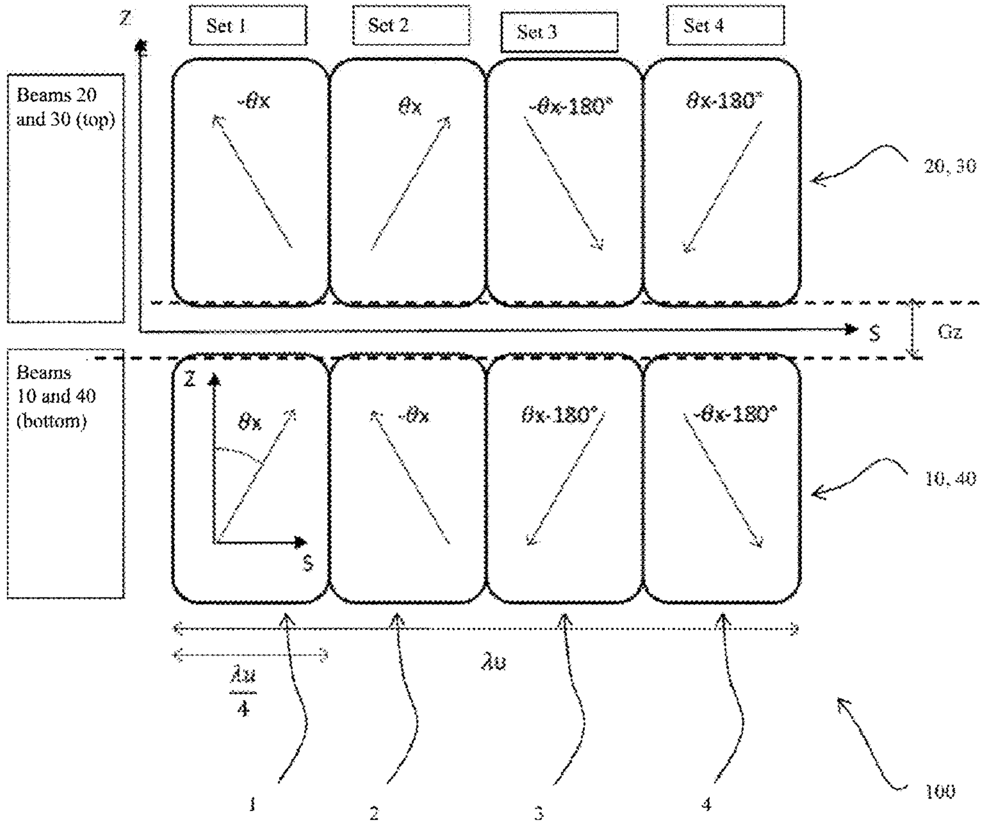

[Fig. 2]
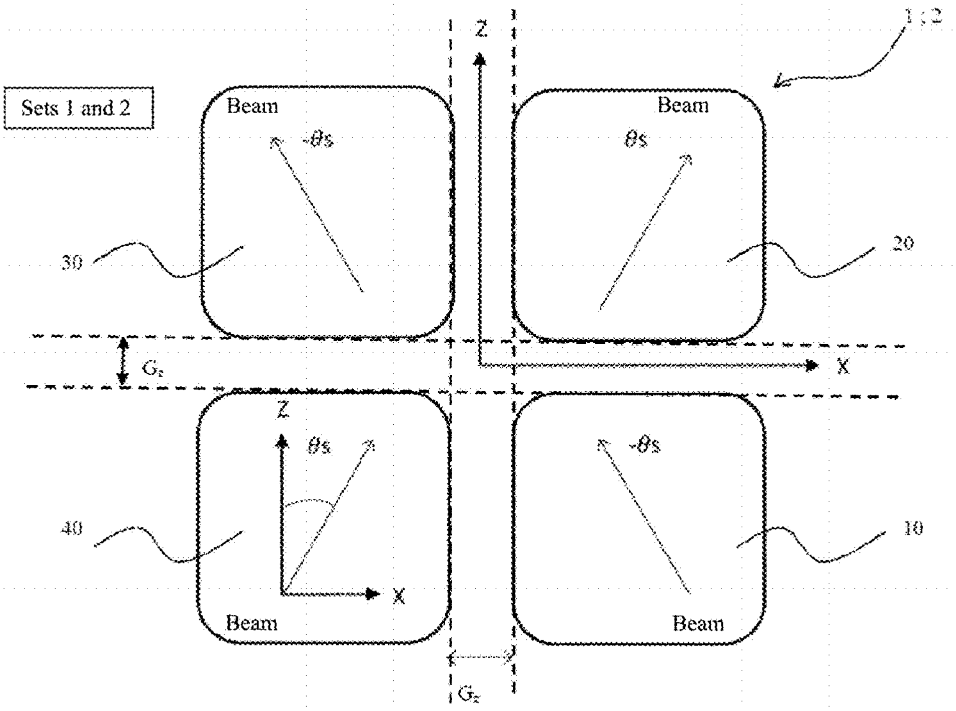
[Fig. 3]
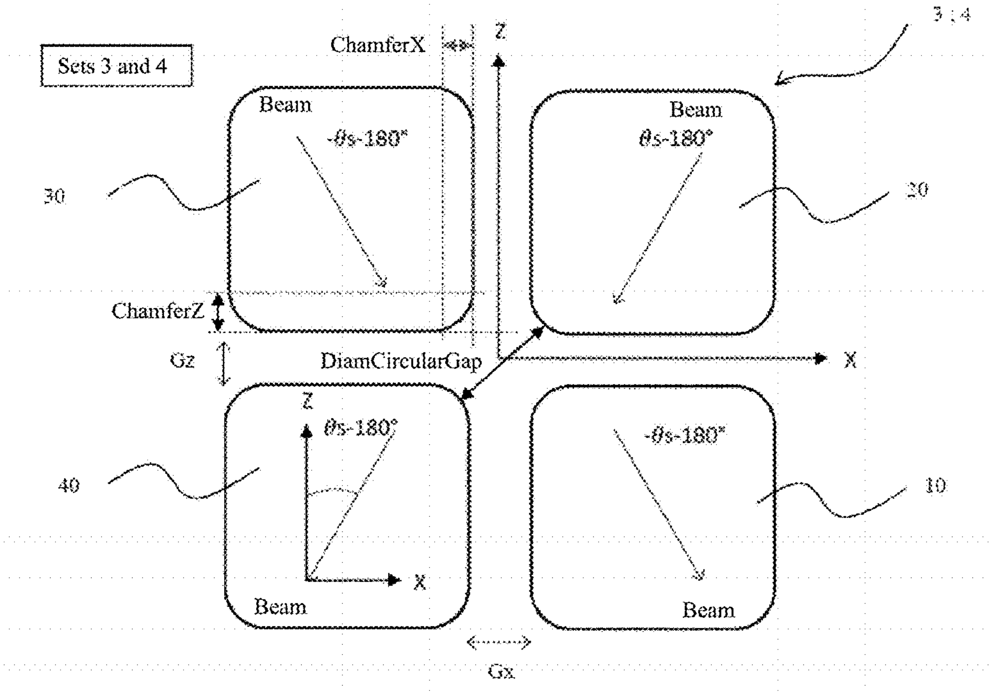

[Fig. 4]
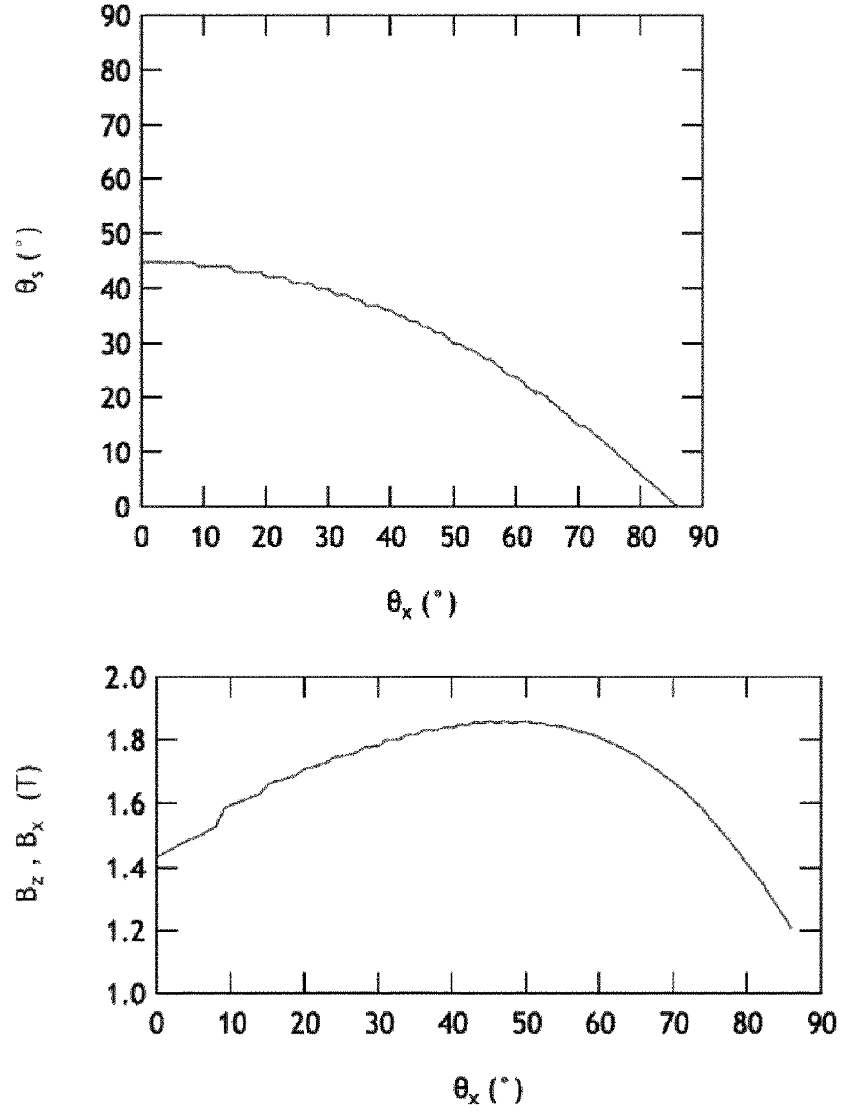

[Fig. 5]
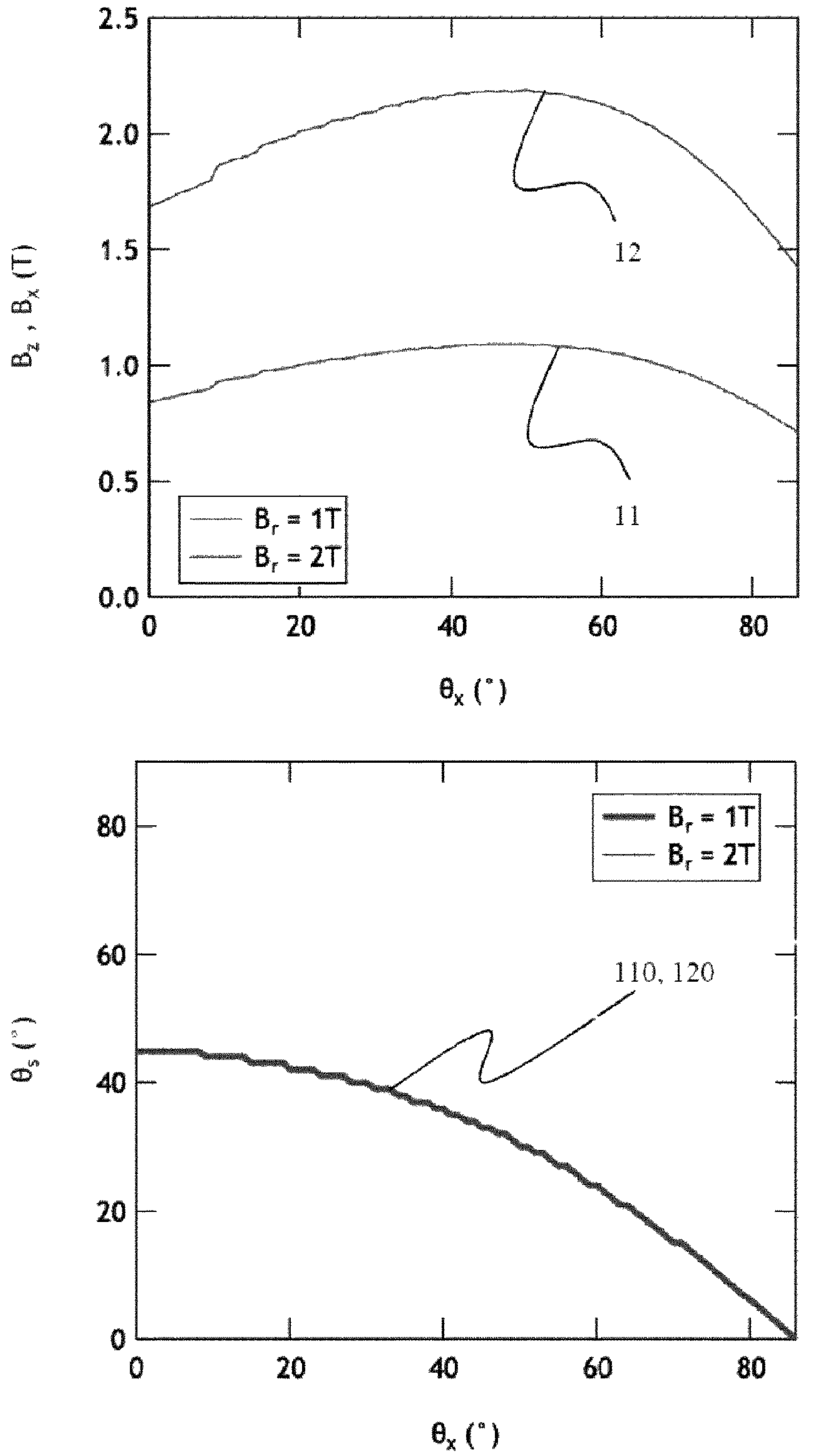

[Fig. 6]
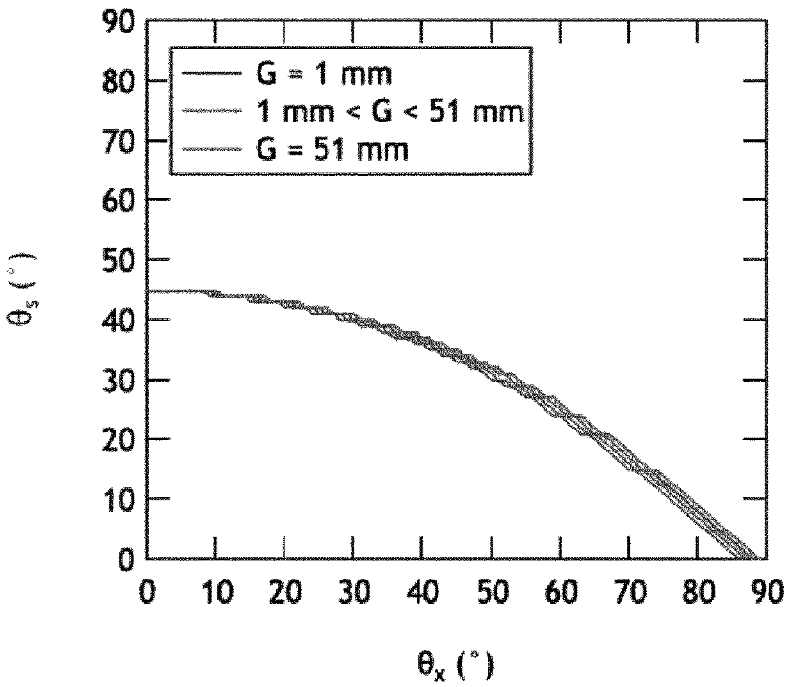
[Fig. 7]
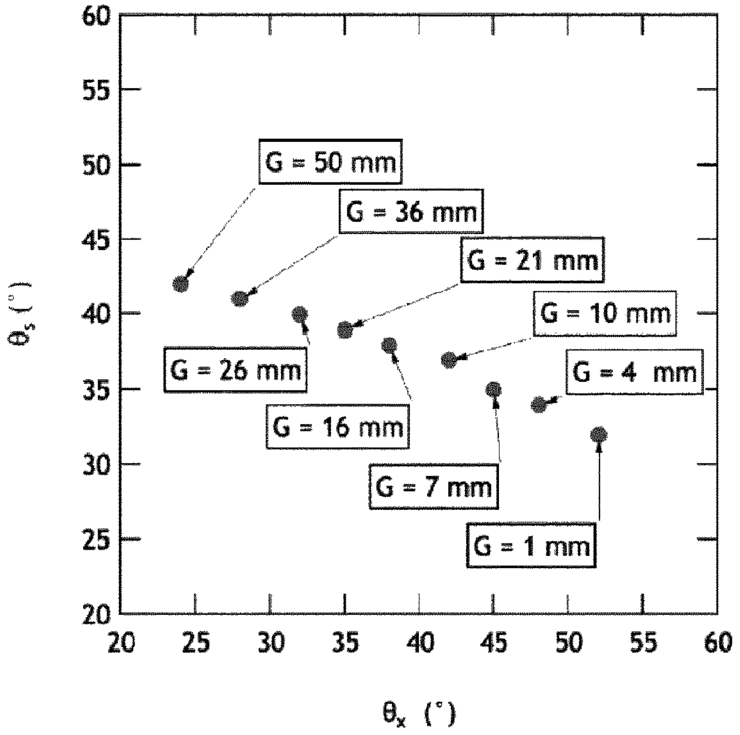

[Fig. 8]
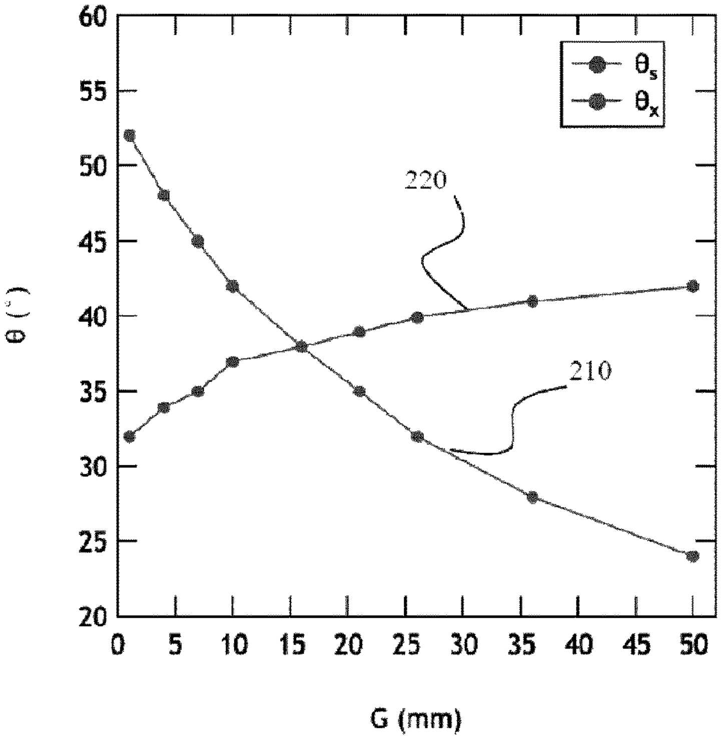
[Fig. 9]
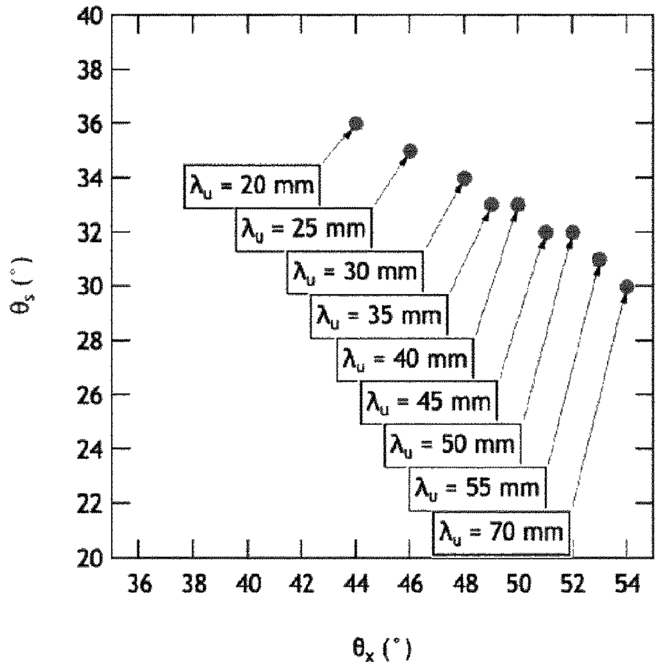

[Fig. 10]
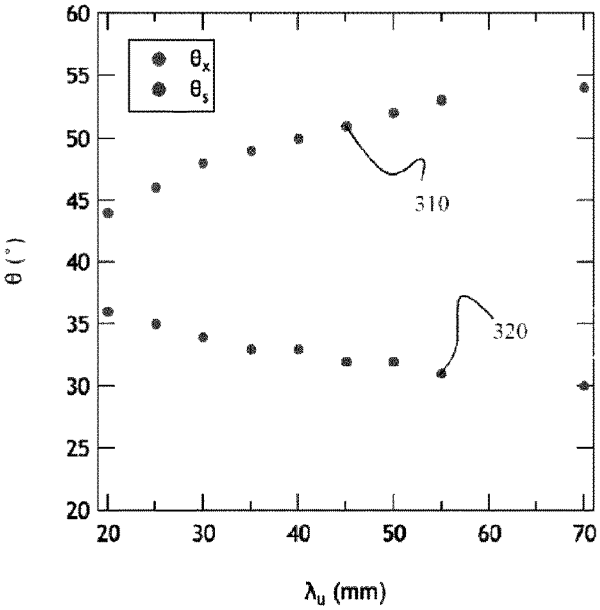
[Fig. 11]
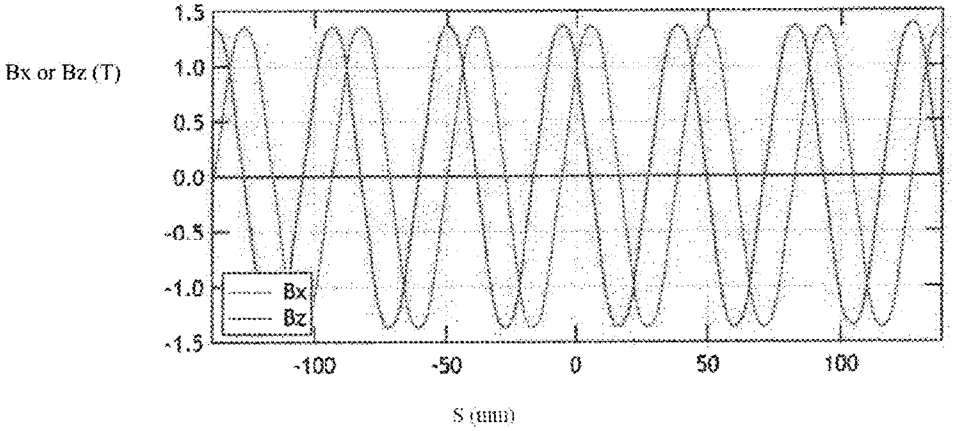

[Fig. 12]
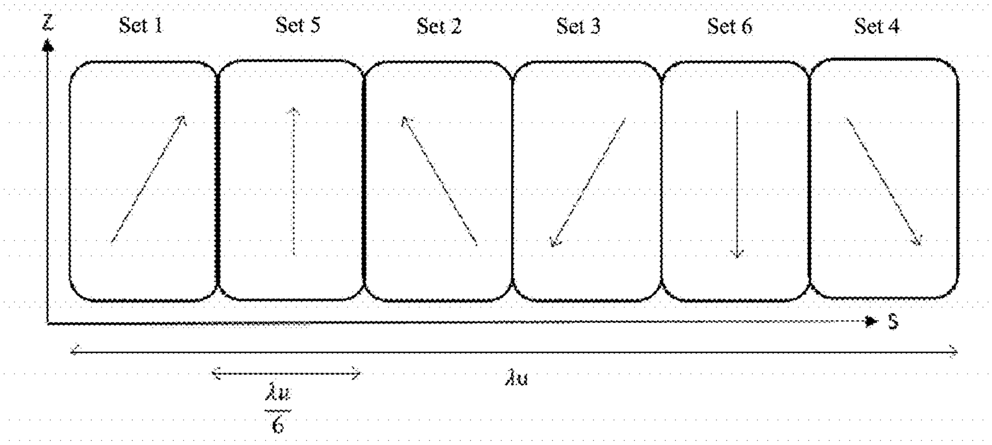
[Fig. 13]
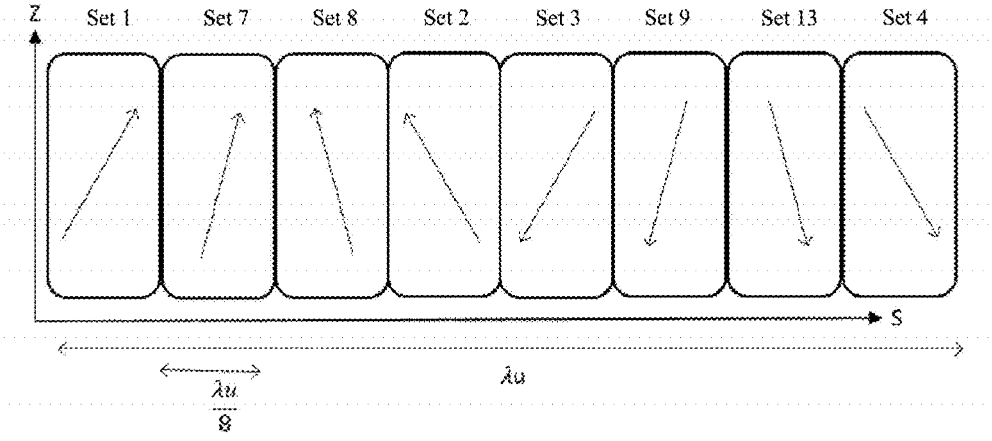
[Fig. 14]
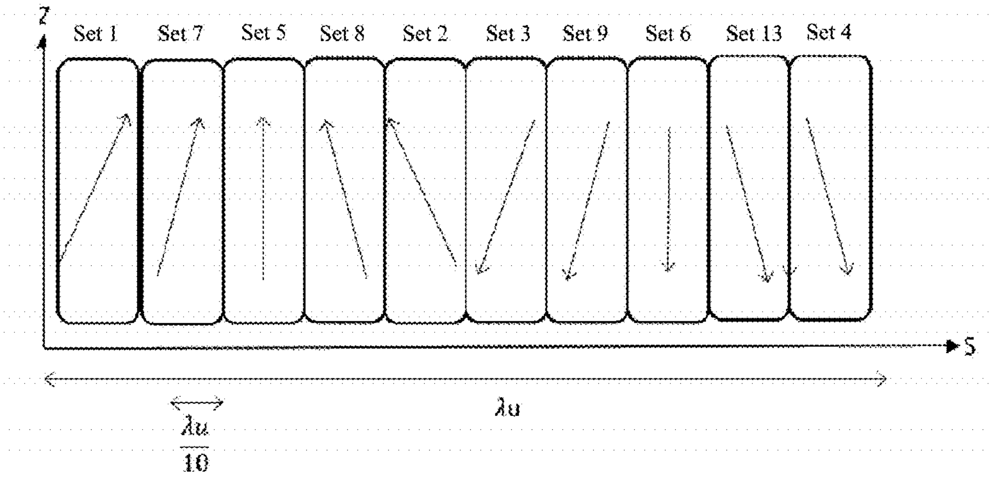

[Fig. 15]
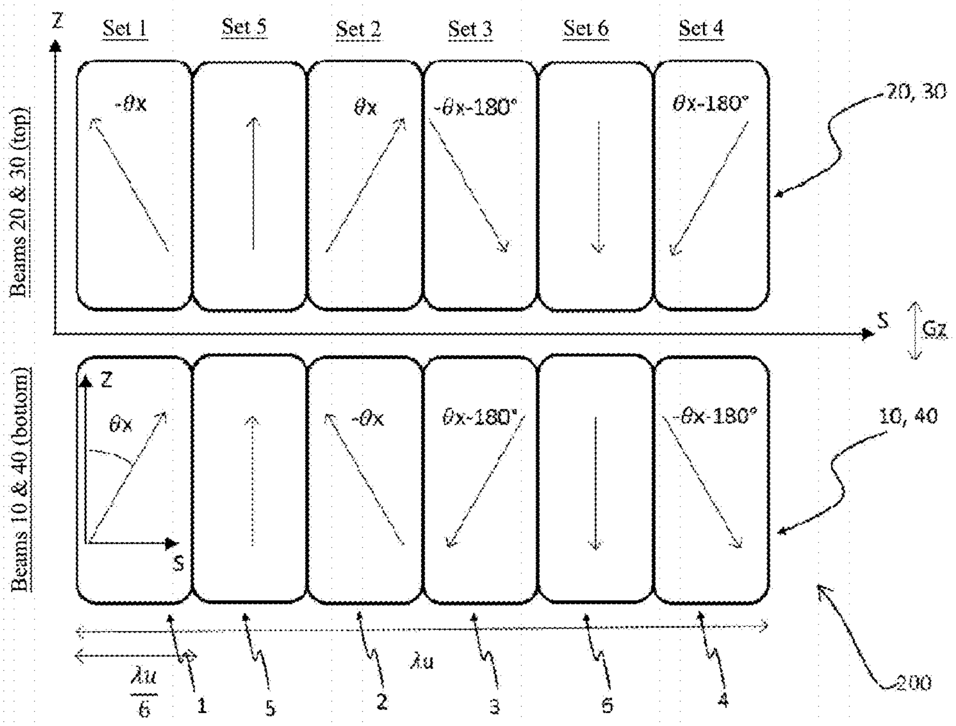
[Fig. 16]
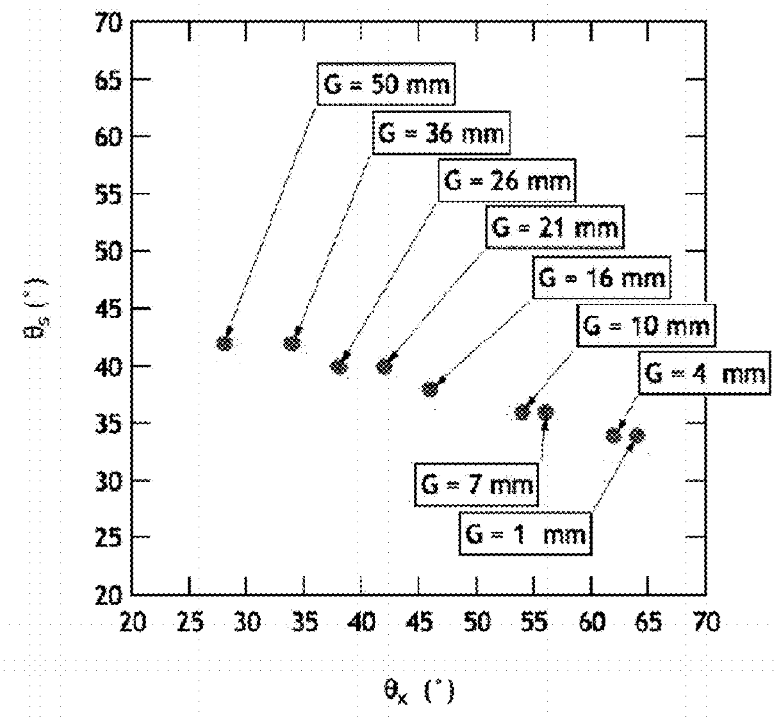

[Fig. 17]
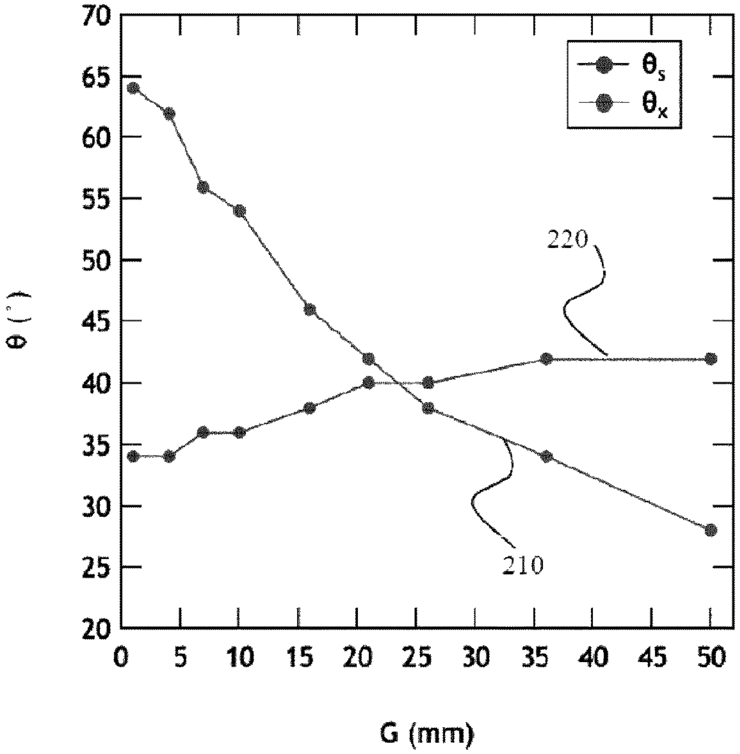
[Fig. 18]
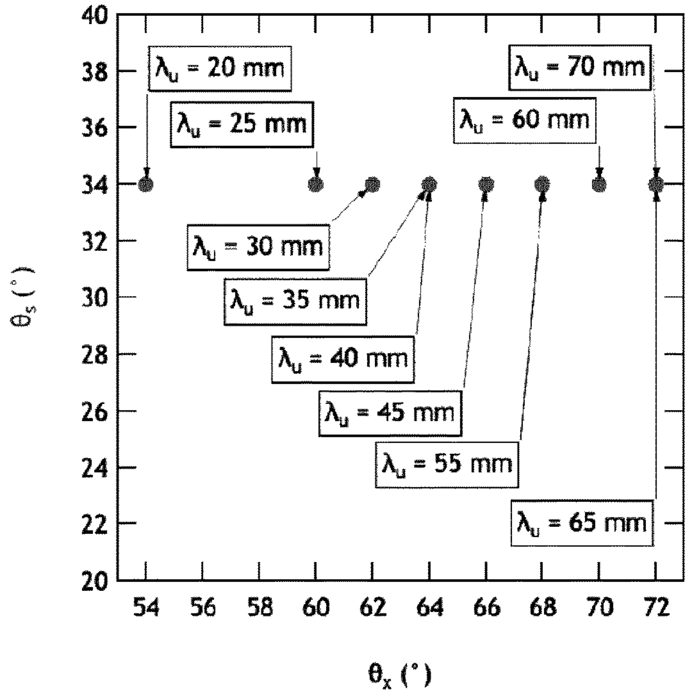

[Fig. 19]
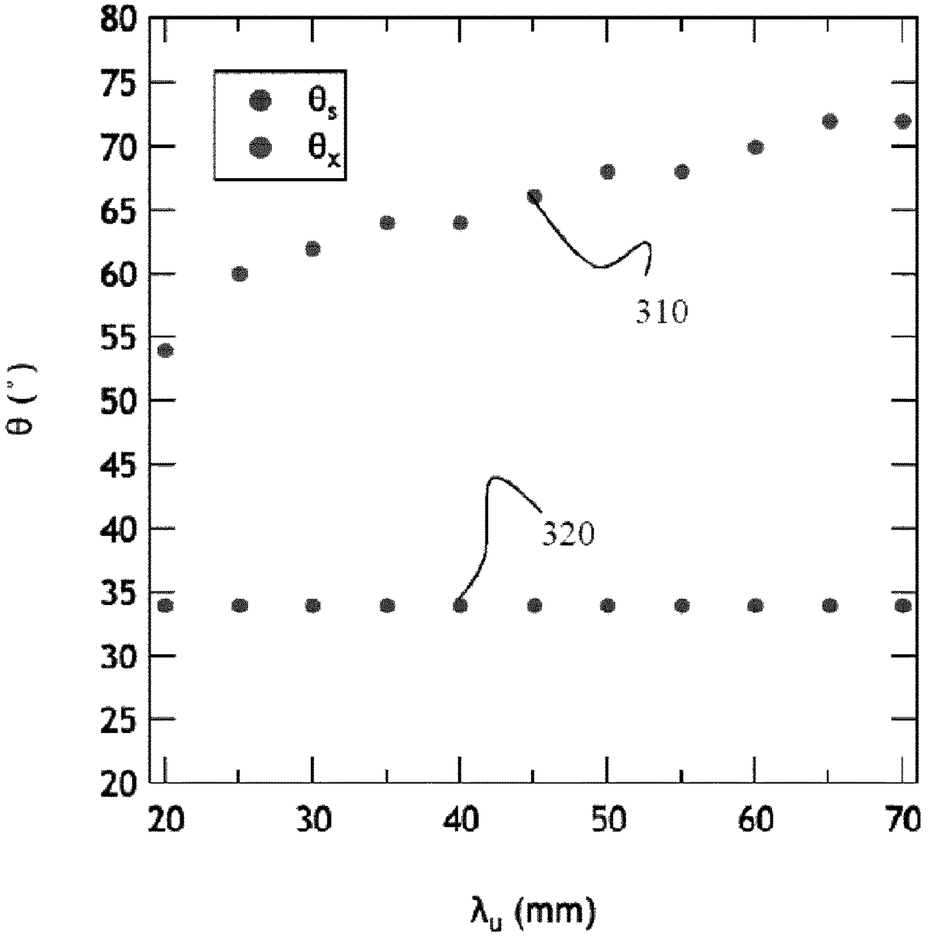

MAGNET STRUCTURE WITH IMPROVED PERFORMANCE, INVERTER, AND ASSOCIATED METHOD

BACKGROUND

The present invention relates to a magnet structure. It also relates to an undulator comprising such a structure, as well as an associated method.

Such a device allows a user to generate a magnetic field. The field of the invention is more particularly, but not limited to, that of particle accelerators.

Document U.S. Pat. No. 5,383,049 describes an adjustable-phase insertion device with elliptical polarization.

The article by Sasaki et al. (Nuclear Instruments & Methods in Physics Research A 331 (1993) July 1) describes the design of a new type of planar undulator for generating variable polarized radiation.

The article of Liang et al. (Nuclear Instruments & Methods in Physics Research A 987 (2021) describes an analysis of the first magnetic results of the PSI APPLE X undulators in elliptical polarization.

An undulator is a device that generates a spatially periodic magnetic field. When charged particles (generally electrons) pass through this device, they are subjected to a force that imparts an oscillating movement to them and generates an electromagnetic wave. Due to its spectral and optical qualities, the radiation emitted, called synchrotron radiation, is used as a tool for probing material in numerous scientific fields (biology, chemistry, etc.). Undulators are characterized by their spatial period and their magnetic field, main parameters that impact the spectral extent of the emitted radiation. APPLE and associated undulators (APPLE I, II, III, X, Delta, etc.) produce a vertical and/or horizontal periodic magnetic field for generating linear polarization (pure or inclined) or circular polarization. They consist of rows of permanent magnets; moving two of them that are diagonally opposite makes it possible to change the phase between the field components, as well as their intensity and therefore to vary the helicity of the polarization. On each row, the permanent magnets are assembled in accordance with a Halbach structure. The latter consists in alternating permanent magnets whose magnetization vector rotates by 90° in the beam direction around the horizontal axis of the undulator, each magnet being magnetized in one direction at most. These permanent magnets are generally difficult to maintain in position because they repel one another or are in unstable equilibrium.

For undulators of high magnetic period, each magnet is generally held just by means of a mechanical flange. For undulators of low magnetic period, this single flange no longer suffices because the thickness of the magnet is insufficient. The permanent magnets are then bonded in pairs, or even welded.

In a conventional Halbach structure, over a magnetic period Au, the magnetization vector rotates from one magnet to another by 90° around the horizontal axis if four magnets are used to form the period.

APPLE undulators consist of four longitudinally mobile beams to vary the phase between the field components and therefore the polarization of the electrons, or vertically (low vs high) in order to modify the strength of the magnetic field and therefore the resonance energy of the undulator. The two low rows have the same sequence of magnets, while on the upper beams, the magnets magnetized longitudinally are in the opposite direction to the low beams.

The benefit of the APPLE undulators is to be able to vary the polarization in linear or circular mode. However, in this type of magnet structure, the horizontal and vertical field components are not equal, the resonance energy is then bounded by the value of the lowest magnetic field component. To overcome the fact that the field components are not equivalent, it is possible to incline the magnetization vector of the vertically magnetized magnets at 45°, which makes it possible to obtain the equality of the horizontal and vertical components and thus no longer be limited in energy by one or the other. This is the case of APPLE I or APPLE X type undulators.

In the case of APPLE I or II or Ill or X undulators, the longitudinal dimension of each magnet is equal to the period that divides the number of magnets constituting the period. Thus, for an undulator of 40 mm magnetic period, the permanent magnets have a thickness of 10 mm. It is not easy to mechanically maintain an element 10 mm wide on which magnetic forces are exerted in the 3 directions. To remedy this, some use adhesive, others implement methods for welding magnets together.

The purpose of the present invention is to propose a magnet structure or an undulator making it possible to generate a magnetic field (preferably significant) while facilitating the assembly of the magnets between them, and which can preferably dispense with or limit the use of adhesive or welding or a flange to assemble these magnets, preferably for elliptical polarization, of short spatial and effective period.

SUMMARY

This objective is achieved with a magnet structure comprising a number N of sets of permanent magnets installed periodically along a direction S with a spatial period Au (preferably a first, second, third and fourth set), N being greater than or equal to four:

- each set comprising:
  - a magnet of a first beam
  - a magnet of a second beam
  - a magnet of a third beam
  - a magnet of a fourth beam
- the magnets of each beam being arranged in succession in the direction S, the first beam and the second beam being arranged in succession in a direction Z perpendicular to the direction S,
- the fourth beam and the third beam being arranged in succession in the direction Z,
- the third beam and the second beam being arranged in succession in a direction X perpendicular to the directions S and Z,
- the fourth beam and the first beam being arranged in succession in the direction X,
- characterized in that, for at least four successive (but not necessarily neighboring) sets of magnets of a spatial period Au, the magnetization vector of each magnet (of these at least 4 sets) of each beam has a non-zero component in each of the directions X, S and Z.

N is a positive integer.

N is preferably an even number.

N is preferably greater than or equal to four.

N is preferably less than or equal to ten.

N is preferably less than or equal to eight.

N may for example be equal to four, six, or eight.

The magnet structure according to the invention may further be characterized in that the sets comprise a first, second, third and fourth successive sets in this order, and in that:

- the magnetization vector of each magnet of the second beam and of the third beam has, in a projection in a plane comprising the directions Z and S, a direction that forms, with the direction Z:
  - an angle of $-\theta_x$ for the first set, and/or
  - an angle of $+\theta_x$ for the second set, and/or
  - an angle of $-\theta_x-180°$ for the third set, and/or
  - an angle of $\theta_x-180°$ for the fourth set.

The magnet structure according to the invention may further be characterized in that:

- the magnetization vector of each magnet of the first beam and the fourth beam has, in a projection in a plane comprising the directions Z and S, a direction that forms, with the direction Z:
  - an angle of $\theta_x$ for the first set, and/or
  - an angle of $-\theta_x$ for the second set, and/or
  - an angle of $\theta_x-180°$ for the third set, and/or
  - an angle of $-\theta_x-180°$ for the fourth set.

The magnet structure according to the invention may further be characterized in that:

- the magnetization vector of each magnet of the first set and the second set has, in a projection in a plane comprising the directions Z and X, a direction that forms, with the direction Z:
  - an angle of $-\theta s$ for the first beam, and/or
  - an angle of $\theta s$ for the second beam, and/or
  - an angle of $-\theta s$ for the third beam, and/or
  - an angle of $\theta s$ for the fourth beam.

The magnet structure according to the invention may further be characterized in that:

- the magnetization vector of each magnet of the third set and the fourth set has, in a projection in a plane comprising the directions Z and X, a direction that forms, with the direction Z:
  - an angle of $-\theta_s-180°$ for the first beam, and/or
  - an angle of $\theta_s-180°$ for the second beam, and/or
  - an angle of $-\theta_s-180°$ for the third beam, and/or
  - an angle of $\theta_s-180°$ for the fourth beam.
- $\theta_x$ may be different from 0°, 90°, 180° or 270°, preferably to +1°, even preferably to +5°.
- $\theta_x$ may be comprised in the interval ]5°; 80°], preferably in the interval [24°; 72°], preferably in the interval [24°; 54°] for N=4 and/or in the interval [28°; 72°] for N=6.
- $\theta_s$ may be different from 0°, 90°, 180° or 270°, preferably to +1°, even preferably to +5°.
- $\theta_s$ may be different from 45°, 135°, 225° or 315°, preferably to +1°, even preferably to +2°.
- $\theta_s$ may be comprised in the interval ]5°; 43°], preferably in the interval [30°; 42°], preferably in the interval [30°; 42°] for N=4 and/or in the interval [34°; 42°] for N=6.
- The number N of sets is equal to 4 or 6.
- In the case where N=6, the sets may further comprise:
- A fifth set between the first and the second set
- A sixth set between the third and fourth sets so that the sets comprise the first, fifth, second, third, sixth and fourth successive sets in this order. In this case, preferably:
- the magnetization vector of each magnet of the second beam and of the third beam has, in a projection in a plane comprising the directions Z and S, a direction that forms, with the direction Z:
  - an angle of 0° for the fifth set, and/or
  - an angle of 180° for the sixth set, and/or
- the magnetization vector of each magnet of the first beam and the fourth beam has, in a projection in a plane comprising the directions Z and S, a direction that forms, with the direction Z:
  - an angle of 0° for the fifth set, and/or
  - an angle of 180° for the sixth set, and/or

- the magnetization vector of each magnet of the fifth set has, in a projection in a plane comprising the directions Z and X, a direction that forms, with the direction Z:
  - an angle of $-\theta s$ for the first beam, and/or
  - an angle of $\theta s$ for the second beam, and/or
  - an angle of $-\theta s$ for the third beam, and/or
  - an angle of $\theta s$ for the fourth beam, and/or

- the magnetization vector of each magnet of the sixth set has, in a projection in a plane comprising the directions Z and X, a direction that forms, with the direction Z:
  - an angle of $-\theta_s-180°$ for the first beam, and/or
  - an angle of $\theta_s-180°$ for the second beam, and/or
  - an angle of $-\theta_s-180°$ for the third beam, and/or
  - an angle of $\theta_s-180°$ for the fourth beam.
- $\lambda_u$ may be comprised in the interval [15 mm; 200 mm], preferably in the interval [20 mm; 70 mm].

The magnet structure according to the invention may further be characterized in that:

- the first beam and the second beam are separated by a distance $G_z$ along the Z direction, and/or
- the fourth beam and the third beam are separated by the distance $G_z$ along the Z direction, and/or
- the third beam and the second beam are separated by a distance $G_x$ along the X direction, and/or
- the fourth beam and the first beam are separated by the distance $G_x$ along the X direction.

$G_x$ may be comprised in the interval [1 mm; 250 mm], preferably in the interval [1 mm; 50 mm], and/or $G_z$ is comprised in the interval [1 mm; 250 mm], preferably in the interval [1 mm; 50 mm].

$G_x$ may be equal (or substantially equal, to +500 μm near preferably to +200 μm) to $G_z$, subsequently denoted G.

$\theta_x$ may be equal to, preferably if N=4:

$$\theta_x(G;\lambda_u) = Offset1 + AGap1 * \exp(BGap1 * G) + APeriod1 * \exp(BPeriod1 * \lambda_u) \text{ to within} \pm 10\%, \text{ perferably to within} \pm 5\%$$

where:

$$Offset1 = 33.634 \pm 0.17$$

$$AGap1 = 29.434 \pm 0.109$$

$$BGap1 = -0.041763 \pm 0.000374$$

$$APeriod1 = -39.534 \pm 0.104$$

$$BPeriod1 = -0.027176 \pm 0.000263$$

$\theta_S$ may be equal to, preferably if $N = 4$:

$$\theta_S(G;\lambda_u) = Offset2 + AGap2 * \exp(BGap2 * G) + APeriod2 * \exp(BPeriod2 * \lambda_u) \text{ to within} \pm 5\%, \text{ perferably to within} \pm 2\%$$

$$Offset2 = 35.233 \pm 0.147$$

$$AGap2 = -10.382 \pm 0.0218$$

-continued $$BGap2 = -0.066698 \pm 0.000476$$

$$APeriod2 = 13.866 \pm 0.0918$$

$$BPeriod2 = -0.015736 \pm 0.000349$$

$\theta_x$ may be equal to, preferably if $N = 6$:

$$\theta_x(G;\lambda_u) = Offset4 + AGap4 * \exp(BGap4 * G) + APeriod4 * \exp(BPeriod4 * \lambda_u) \text{ to within} \pm 4\%, \text{ perferably to within} \pm 3\%,$$

where:

$$Off4 = 49.848 \pm 0.3$$

$$AGap4 = 41.206 \pm 0.0801$$

$$BGap4 = -0.038149 \pm 0.000217$$

$$APeriod4 = -54.559 \pm 0.148$$

$$BPeriod4 = -0.018134 \pm 0.000223$$

$\theta_S$ may be equal to, preferably if $N = 6$:

$$\theta_S(G;\lambda_u) = Offset3 + AGap3 * \exp(BGap3 * G) + APeriod3 * \exp(BPeriod3 * \lambda_u) \text{ to within} \pm 7\%, \text{ perferably to within} \pm 3\%,$$

where:

$$Off3 = 37.222 \pm 0.201$$

$$AGap3 = -9.6508 \pm 0.0384$$

$$BGap3 = -0.038257 \pm 0.000448$$

$$APeriod3 = 12.099 \pm 0.13$$

$$BPeriod3 = -0.1507 \pm 0.000503$$

The magnet structure according to the invention may further be arranged to generate a magnetic field with its component along the direction Z equal, or substantially equal, to +5%, preferably to +1%, at its component along the direction X.

According to still another aspect of the present invention, an undulator is proposed comprising:

- a magnet structure according to the invention,
- preferably a vacuum chamber arranged
- around the magnet structure so that the magnets of the magnet structure are located inside the vacuum, or
- inside the magnet structure, among the four beams
- preferably a cryogenic cooling system (preferably nitrogen or helium) arranged to cool the magnets of the magnet structure (preferably when the vacuum chamber is arranged around the magnet structure).

According to yet another aspect of the invention, a method is proposed for generating a magnetic field, characterized in that it is generated by means of a magnet structure according to the invention or an undulator according to the invention.

The magnetic field can be generated with its component along the direction Z equal, or substantially equal, to +5%, preferably to +1%, to its component along the direction X.

BRIEF DESCRIPTION OF THE DRAWINGS

Other benefits and features shall become evident upon examining the detailed description of entirely non-limiting embodiments and implementations, and from the following enclosed drawings:

FIG. 1 is a profile view of four sets 1, 2, 3, 4 of magnets (each set 1, 2, 3, 4 comprising a magnet of one of the beams 10, 20, 30, 40) of a first embodiment of a magnet structure 100 according to the invention (N=4) which is the preferred embodiment of the invention; in this figure, each magnet is represented by a rectangle with rounded corners and has a direction of its permanent magnetization vector, projected in the plane of FIG. 1 comprising the directions S and Z, shown by an arrow inside the rectangle of this magnet, FIG. 2 is a front view of the four beams 10, 20, 30, 40 bearing the magnets for the sets of magnets 1 and 2 of the first embodiment of a magnet structure 100 according to the invention; in this figure, each magnet is represented by a square with rounded corners and has a direction of its permanent magnetization vector, projected in the plane of FIG. 2 comprising the directions X and Z, shown by an arrow inside the square of this magnet, FIG. 3 is a front view of the same four beams 10, 20, 30, 40 of FIG. 2, bearing the magnets for the sets of magnets 3 and 4 of the first embodiment of a magnet structure 100 according to the invention; in this figure, each magnet is represented by a square with rounded corners and has a direction of its permanent magnetization vector, projected in the plane of FIG. 3 comprising the directions X and Z, shown by an arrow inside the square of this magnet, FIG. 4 shows:

- In its upper part, the angle θs as a function of the angle $\theta_x$ for values of $\theta_s$ and $\theta_x$ for which the component $B_z$ in the direction Z of the magnetic field generated by the magnet structure 100 is equal to the component $B_x$ in the direction X of the magnetic field generated by the magnet structure 100: $B_z=B_x$
- In its lower part, the value of $B_z=B_x$ as a function of ex.

FIG. 5 shows:

- In its upper part, the value of $B_x$ and $B_z$ as a function of $\theta_x$ according to two assumptions:
  - A first curve 11 for which a remanent field $B_r$ is considered of each magnet of 1 Tesla
  - A second curve 12 for which a remanent field $B_r$ is considered of each magnet of 2 Tesla.
- In its lower part, two quasi-superimposed curves 110, 120 of the angle θs as a function of the angle $\theta_x$ corresponding to the cases of the two curves 11 and 12.

FIG. 6, obtained on the same principle as the upper part of FIG. 4 or the lower part of FIG. 5, shows the angle θs as a function of the angle $\theta_x$ for values of θs and $\theta_x$ for which the component $B_z$ in the direction Z of the magnetic field generated by the magnet structure 100 is equal to the component $B_x$ in the direction X of the magnetic field generated by the magnet structure 100, with different curves corresponding to different values of the distance G.

FIG. 7 shows the angle θs as a function of the angle $\theta_x$ for values of θs and $\theta_x$ for which the component $B_z$ in the direction Z of the magnetic field generated by the magnet structure 100 is equal to the component $B_x$ in the direction X of the magnetic field generated by the magnet structure 100 and is maximum, for different values of the distance g (in this case $G=G_x=G_z$) which is the distance between the edges of the beams 10, 20, 30, 40 facing one another.

FIG. 8 shows:

- A curve 210 of $\theta_x$ as a function of G, and
- A curve 220 of θs as a function of G, for values of θs and $\theta_x$ for which the component $B_z$ in the direction Z of the magnetic field generated by the magnet structure 100 is equal to the component $B_x$ in the direction X of the magnetic field generated by the magnet structure 100 and maximum FIG. 9 shows the angle θs as a function of the angle $\theta_x$ for different values of spatial period Au, and for which the component $B_z$ in the direction Z of the magnetic field generated by the magnet structure 100 is equal to the component $B_x$ in the direction X of the magnetic field generated by the magnet structure 100 and maximum FIG. 10 shows on the vertical axis values of angle θ corresponding to $\theta_x$ or $\theta_s$:

Points of a curve 310 of $\theta_x$ as a function of the spatial period $\lambda_u$, and Points of a curve 320 of θs as a function of the spatial period $\lambda_u$, for values of θs and $\theta_x$ for which the component $B_z$ in the direction Z of the magnetic field generated by the magnet structure 100 is equal to the component $B_x$ in the direction X of the magnetic field generated by the magnet structure 100 and maximum FIG. 11 shows the values of the magnetic fields $B_x$ and $B_z$ generated by the structure 100 as a function of the longitudinal position S at the center of the four magnets of each set 1, 2, 3 or 4, out of vacuum or in the center of a vacuum chamber of the undulator 1000 comprising the structure 100, FIG. 12 is a generalization for N=6 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet, FIG. 13 is a generalization for N=8 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet, FIG. 14 is a generalization for N=10 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet FIG. 15 is a profile view of six sets 1, 5, 2, 3, 6, and 4 of magnets (each set comprising a magnet of one of the beams 10, 20, 30, 40) of a second embodiment of a magnet structure 200 according to the invention; in this figure, each magnet is represented by a rectangle with rounded corners and has a direction of its permanent magnetization vector, projected in the plane of FIG. 15 comprising the directions S and Z, shown by an arrow inside the rectangle of this magnet, FIG. 16 shows the angle θs as a function of the angle $\theta_x$ for values of θs and $\theta_x$ for which the component $B_z$ in the direction Z of the magnetic field generated by the magnet structure 200 is equal to the component $B_x$ in the direction X of the magnetic field generated by the magnet structure 200 and is maximum, for different values of the distance G (in this case $G=G_x=G_z$) which is the distance between the edges of the beams 10, 20, 30, 40 facing one another.

FIG. 17 shows:

A curve 210 of $\theta_x$ as a function of G, and

A curve 220 of θs as a function of G, for values of θs and $\theta_x$ for which the component $B_z$ in the direction Z of the magnetic field generated by the magnet structure 200 is equal to the component $B_x$ in the direction X of the magnetic field generated by the magnet structure 200 and maximum FIG. 18 shows the angle θs as a function of the angle $\theta_x$ for different values of spatial period $\lambda_u$, and for which the component $B_z$ in the direction Z of the magnetic field generated by the magnet structure 200 is equal to the component $B_x$ in the direction X of the magnetic field generated by the magnet structure 200 and maximum FIG. 19 shows, on the vertical axis, values of angle θ corresponding to $\theta_x$ or $\theta_s$:

Points of a curve 310 of $\theta_x$ as a function of the spatial period Au, and Points of a curve 320 of θs as a function of the spatial period Au, for values of θs and $\theta_x$ for which the component $B_z$ in the direction Z of the magnetic field generated by the magnet structure 200 is equal to the component $B_x$ in the direction X of the magnetic field generated by the magnet structure 200 and maximum.

DETAILED DESCRIPTION

With reference to FIG. 11, throughout the present description it will be noted that the component $B_z$ in the direction Z of the magnetic field generated by the magnet structure 100 or 200 is equal to the component $B_x$ in the direction X of the magnetic field generated by the magnet structure 100 or 200 ($B_z=B_x$), when:

The amplitude of $B_z$, at the center of the four beams 10, 20, 30, 40 (the component $B_z$ in the direction Z of the magnetic field generated by the magnet structure 100 or 200 having a value that varies as a function of the position according to S), is equal to:

The amplitude of $B_x$, at the center of the four beams 10, 20, 30, 40 (the component $B_x$ in the direction X of the magnetic field generated by the magnet structure 100 or 200 having a value that varies as a function of the position according to S).

In other words, the field peaks of $B_z$ and $B_x$ are equal, and fields $B_z$ and $B_x$ can be phase-shifted.

These embodiments are in no way limiting, and in particular, it is possible to consider variants of the invention that comprise only a selection of the features disclosed or shown hereinafter in isolation from the other features disclosed or shown (even if that selection is isolated within a phrase comprising other features), if this selection of features is sufficient to confer a technical benefit or to differentiate the invention with respect to the prior state of the art. This selection comprises at least one preferably functional feature which lacks structural details, and/or only has a portion of the structural details if that portion is only sufficient to confer a technical benefit or to differentiate the invention with respect to the prior state of the art.

First, with reference to FIGS. 1 to 11, a first preferential embodiment of the magnet structure 100 according to the invention is described.

This new magnet structure 100 is derived from a Halbach structure and comprises a particular orientation of the magnetization vector for an optimal retention of the magnets, and is preferably applied to the construction of undulators generating elliptical polarization.

In this embodiment, the magnet structure 100 comprises four successive sets (first set referenced 1 in the figures then second set referenced 2 in the figures then third set referenced 3 in the figures then fourth set referenced 4 in the figures, in this order along the direction S) of permanent magnets installed periodically along a direction S (also denoted Y) with a spatial period $\lambda_u$, including a first, second, third and fourth sets. These four sets 1, 2, 3, 4 are shown only once in FIG. 1, but are in reality repeated periodically along the direction S typically several tens or hundreds of times.

Each set 1, 2, 3, 4 comprises (preferably only as a magnet):

- a magnet of a first beam referenced 10 in the figures, this beam extending in the direction S,
- a magnet of a second beam referenced 20 in the figures, this beam extending in the direction S,
- a magnet of a third beam referenced 30 in the figures, this beam extending in the direction S,
- a magnet of a fourth beam referenced 40 in the figures, this beam extending in the direction S.

The magnets of each beam 10, 20, 20, 40 follow one another along the direction S.

The first beam 10 and the second beam 20 are parallel and follow one another along a direction Z perpendicular to the direction S.

The fourth beam 40 and the third beam 30 are parallel and follow one another along the direction Z.

The third beam 30 and the second beam 20 follow one another along a direction X perpendicular to the directions S and Z.

The fourth beam 40 and the first beam 10 follow one another along the direction X.

Thus, in a sectional view comprising the directions X and Z:

- The beam 10 is located at the bottom right relative to the center of these four beams
- The beam 20 is located at the top right relative to the center of these four beams
- The beam 30 is located at the top left relative to the center of these four beams
- The beam 40 is located at the bottom left relative to the center of these four beams The magnetization vector (which leads to permanent magnetization, but not to a temporary magnetization of an electromagnet), of each magnet of each beam 10, 20, 30, 40 has a non-zero component along each of the directions X, S and Z.

We note, with reference to FIGS. 1, 2 and 3, that:

- the magnetization vector of each magnet of the second beam 20 and of the third beam 30 has, in a projection in a plane comprising the directions Z and
- S, a direction that forms, with the direction Z:
  - an angle (about the X axis) of $-\theta_x$ for the first set 1
  - an angle (about the X axis) of $+\theta_x$ for the second set 2
  - an angle (about the X axis) of $-\theta_x-180°$ for the third set 3
  - an angle (about the X axis) of $\theta_x-180°$ for the fourth set 4
- the magnetization vector of each magnet of the first beam 10 and of the fourth beam 40 has, in a projection in a plane comprising the directions Z and S, a direction that forms, with the direction Z:
  - an angle (about the X axis) of $\theta_x$ for the first set 1
  - an angle (about the X axis) of $-\theta_x$ for the second set 2
  - an angle (about the X axis) of $\theta_x-180°$ for the third set 3
  - an angle (about the X axis) of $-\theta_x-180°$ for the fourth set 4
- the magnetization vector of each magnet of the first set 1 and of the second set 2 has, in a projection in a plane comprising the directions Z and X, a direction that forms, with the direction Z:
  - an angle (about the S axis) of −θs for the first beam 10
  - an angle (about the S axis) of θs for the second beam 20
  - an angle (about the S axis) of −θs for the third beam 30
  - an angle (about the S axis) of θs for the fourth beam 40

- the magnetization vector of each magnet of the third set 3 and the fourth set 4 has, in a projection in a plane comprising the directions Z and X, a direction that forms, with the direction Z:
  - an angle (about the S axis) of $-\theta_s-180°$ for the first beam 10
  - an angle (about the S axis) of $\theta_s-180°$ for the second beam 20
  - an angle (about the S axis) of $-\theta_s-180°$ for the third beam 30
  - an angle (about the S axis) of $\theta_s-180°$ for the fourth beam 40.

$\theta_x$ is different from 0°, 90°, 180° or 270°, preferably to +1°, even preferably to ±5°.

θs is different from 0°, 90°, 180° or 270°, preferably to +1°, even preferably to +5°.

θs is different from 45°, 135°, 225° or 315°, preferably to +1°, even preferably to +2°.

FIG. 4 shows:

- In its upper part, the angle θs as a function of the angle $\theta_x$ for values of $\theta_s$ and $\theta_x$ for which the component $B_z$ in the direction Z of the magnetic field generated by the magnet structure 100 is equal to the component $B_x$ in the direction X of the magnetic field generated by the magnet structure 100: $B_z=B_x$ In its lower part, the value of $B_z=B_x$ as a function of ex.

FIG. 4 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm=10 mm along the S axis
- $\lambda_u$=40 mm
- $G_z=G_x$=1 mm
- Remanent field $B_r$ of 1.67 T In reference to FIG. 4, it is noted that there is a pair θs and $\theta_x$ for which the value of $B_z=B_x$ is maximum.

FIG. 5 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z=G_x$=1 mm
- Remanent field $B_r$ 1 or 2 T.

Referring to FIG. 5, it will be noted that the values of 0 s and $\theta_x$ for which the value of $B_z=B_x$ is maximum do not depend on remanent field $B_r$ of each magnet.

We note, with reference to FIGS. 1, 2 and 3, that:

- the first beam 10 and the second beam 20 are separated by a distance (also called air gap) $G_z$ along the Z direction,
- the fourth beam 40 and the third beam 30 are separated by the distance $G_z$ along the Z direction,
- the third beam 30 and the second beam 20 are separated by a distance (also called air gap) $G_x$ along the direction X,
- the fourth beam 40 and the first beam 10 are separated by the distance $G_x$ along the direction X.

$G_x$ is typically within the interval [1 mm; 250 mm], preferably in the interval [1 mm; 50 mm], and/or $G_z$ is typically within the interval [1 mm; 250 mm], preferably in the interval [1 mm; 50 mm].

These $G_x$ or $G_z$ values lead to a circular opening (for a passage of a beam at the center of the beams 10, 20, 30, 40) whose diameter is greater than $G_x$ and $G_z$ and depends on $G_x$, $G_z$ and chamfers at the corners of the magnets.

The value of the chamfer is calculated as follows:

$$ChamferZ = DiamCircularGap / root(2) - Gz$$

$$ChamferX = DiamCircularGap / root(2) - Gx$$

With ChamferZ, DiamCircularGap and ChamferX as defined in FIG. 3.

$G_x$ is equal, or substantially equal, to ±500 µm, preferably to within ±200 µm, at $G_z$, and is noted in this case in the present distance description (also called air gap) G.

FIG. 6 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z$=$G_x$=G with a value variable between 1 mm and 51 mm
- Remanent field $B_r$ of 1.67 T.

FIG. 7 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z$=$G_x$=G with a value variable between 1 mm and 51 mm
- Remanent field $B_r$ of 1.67 T.

FIG. 8 is obtained by digital simulation using a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z$=$G_x$=G with a value variable between 1 mm and 51 mm
- Remanent field $B_r$ of 1.67 T.

An interpolation gives:

$$_S = 42.4 - 10.8 \cdot \exp(-0.059 \cdot G)$$

$$\theta_x = 18.4 + 34.4 \cdot \exp(-0.035 \cdot g)$$

With θs and $\theta_x$ expressed in degrees) (° and G expressed in mm.

Referring to FIGS. 6, 7 and 8, it is noted that the ideal values of $\theta_s$ and $\theta_x$ for which the value of $B_z$=$B_x$ is maximum depend on G. Examples of these ideal values as a function of G are noted in the table below with the assumptions of FIGS. 6 to 8:

TABLE 1

| G (mm) | θx (°) (optimal values at +/−0.5°) | θs (°) (optimal values at +/−0.5°) |
|---|---|---|
| 1 | 52 | 32 |
| 4 | 48 | 34 |
| 7 | 45 | 35 |
| 10 | 42 | 37 |
| 16 | 38 | 38 |
| 21 | 35 | 39 |
| 26 | 32 | 40 |
| 36 | 28 | 41 |
| 50 | 24 | 42 |

Furthermore, it will be noted that an optimal torque ($B_x$=$B_z$ and maximum) values of θs and $\theta_x$ at an air gap G leads to $B_z$=$B_x$ (but not necessarily maximum) for all the other air gaps G tested.

FIG. 9 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- Au variable from 20 to 70 mm
- $G_z$=$G_x$=G=1 mm
- Remanent field $B_r$ of 1.67 T.

FIG. 10 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- Au variable from 20 to 70 mm
- $G_z$=$G_x$=G=1 mm
- Remanent field $B_r$ of 1.67 T.

An interpolation gives:

$$\theta_S = 27 + 13 \cdot \exp(-0.024 \cdot \lambda_u)$$

$$\theta_x = 56 - 24.7 \cdot \exp(-0.036 \cdot \lambda_u)$$

With θs and $\theta_x$ expressed in degrees) (°) and $\lambda_u$ expressed in mm.

Thus, with reference to FIGS. 9 and 10, it is noted that the ideal values of θs and $\theta_x$ for which the value of $B_z$=$B_x$ is maximum depend on $\lambda_u$. Examples of these ideal values as a function of Au are noted in the table below with the assumptions of FIGS. 9 and 10:

TABLE 2

| Period $\lambda_u$ (mm) | θx (°) (optimal values at +/−0.5°) | θs (°) (optimal values at +/−0.5°) |
|---|---|---|
| 20 | 44 | 36 |
| 25 | 46 | 35 |
| 30 | 48 | 34 |
| 35 | 49 | 33 |
| 40 | 50 | 33 |
| 45 | 51 | 32 |
| 50 | 52 | 32 |
| 55 | 53 | 31 |
| 60 | 53 | 31 |

TABLE 2-continued

| Period $\lambda_u$ (mm) | θx (°) (optimal values at +/−0.5°) | θs (°) (optimal values at +/−0.5°) |
|---|---|---|
| 65 | 53 | 31 |
| 70 | 54 | 30 |

Thus, depending on the experiments and simulations carried out within the scope of the present invention, it is noted that:

$\theta_x$ is typically within the interval ]5°; 80°], preferably in the interval [24°; 54°].

$\theta_s$ is typically within the interval ]5°; 43° [, preferably in the interval [30°; 42°].

$\lambda_u$ is typically within the interval [15 mm; 200 mm], preferably in the interval [20 mm; 70 mm].

Empirically, it was determined by interpolation that the optimum value of $\theta_x$ expressed in ° (for which $B_x=B_z$ and is maximum) is equal to:

$$\theta_x(G;\lambda_u) = Offset1 + AGap1 * \exp(BGap2 * G) + APeriod1 * \exp(BPeriod1 * \lambda_u) \text{ to within} \pm 10\%, \text{ preferably to within} \pm 5\%$$

where:

$$Offset1 = 33.634 \pm 0.17$$

$$AGap1 = 29.434 \pm 0.109$$

$$BGap1 = -0.041763 \pm 0.000374$$

$$APeriod1 = -39.534 \pm 0.104$$

$$BPeriod1 = -0.027176 \pm 0.000263$$

In this formula, G is expressed in mm and $\lambda_u$ is expressed in mm.

Empirically, it was determined by interpolation that the optimum value of θs expressed in ° (for which $B_x=B_z$ and is maximum) is equal to:

$$\theta_S(G;\lambda_u) = Offset2 + AGap2 * \exp(BGap2 * G) + APeriod2 * \exp(BPeriod2 * \lambda_u) \text{ to within} \pm 5\%, \text{ perferably to within} \pm 2\%$$

$$Offset2 = 35.233 \pm 0.147$$

$$AGap2 = -10.382 \pm 0.0218$$

$$BGap2 = -0.066698 \pm 0.000476$$

$$APeriod2 = 13.866 \pm 0.0918$$

$$BPeriod2 = -0.015736 \pm 0.000349$$

In this formula, G is expressed in mm and Au is expressed in mm.

Thus, the structure 100 is preferably arranged to generate a magnetic field with its component $B_z$ along the direction Z equal, or substantially equal, to ±5%, preferably to ±1% with minimum air gap, to its component $B_x$ along the X direction.

From the structure 100 or 200, an embodiment of an undulator 1000 (not shown) according to the invention is constructed comprising:

the magnet structure 100 or 200, a vacuum chamber arranged:

inside the magnet structure, among (preferably at the center of) the four beams 10, 20, 30, 40, or around the magnet structure so that the magnets of the magnet structure are located inside the vacuum, preferably a cryogenic cooling system (preferably nitrogen or helium) arranged to cool the magnets of the magnet structure (preferably when the vacuum chamber is arranged around the magnet structure).

In one embodiment of the method according to the invention, a magnetic field is generated by means of the magnet structure 100 or 200 or of the undulator 1000. The magnetic field is generated with its component $B_z$ along the direction Z equal, or substantially equal, to +5%, preferably to +1% with minimum air gap, to its component $B_x$ along the X direction.

The distance $G_x$ and/or $G_z$ and/or G can also be adjusted.

FIG. 11, which shows the fields $B_x$ and $B_z$ obtained by the structure 100, is obtained by digital simulation by means of a magnetic field calculation software (RADIA) which calculates the magnetic field generated by a permanent magnet or a sequencing of permanent magnets with the following assumptions:

magnets of transverse dimensions 35 mm×35 mm along the X and Z axes and of dimension Au/N mm along the S axis $\lambda_u$=40 mm $G_z$=$G_x$=G=1 mm Remanent field $B_r$ of 1.67 T.

Thus, according to the invention, the proposed new structure 100 or 200 produces a magnetic field (with an elliptical polarization) as large as the Halbach structure and makes it possible to address the problem of retention of the magnets. Indeed, all the magnets are magnetized along 3 directions (vertical, horizontal and longitudinal). The fact of tilting the magnetization vector in the longitudinal direction makes it possible to keep two magnets naturally bonded. It is thus easier to retain a block of two bonded magnets naturally than a single magnet less thick subjected to opposite forces or two magnets bonded by other non-natural means (welding, adhesive, screws, etc.).

The new structure 100 or 200 proposed makes it possible to respond to this problem, while maintaining the fact that the field components $B_z$, $B_x$ in the two planes are always equivalent.

To do this, all the magnets have an oriented magnetization vector 3 (horizontal, vertical and longitudinal). The inclination of the magnetization vector in the longitudinal plane will allow certain magnets to be adhered naturally in pairs, thus constituting a block of two integral magnets. Thus, no need to weld/bond the magnets together.

In addition, it will be noted that it is not obvious to magnetize a permanent magnet block in three directions because the block must be compacted in the direction of its magnetization vector.

Thus, in a manufacturing method according to the invention of a structure 100 or 200 according to the invention, permanent magnets are compacted that are larger than the desired final size according to a compacting direction parallel to the magnetization vector of these magnets, then each magnet is machined ("at an angle") to give it its shape with the desired direction of its magnetization vector (relative to the orientation of some of its final planar faces).

Finally, it will be noted that, instead of four sets 1, 2, 3, 4, all the embodiments of the invention previously described are generalizable to a number N of sets of permanent magnets installed periodically along the direction S with the spatial period $\lambda_u$.

N is a positive integer.

N is preferably an even number.

N is preferably greater than or equal to four.

N is preferably less than or equal to eight or ten.

N may for example be equal to four, six, or eight.

For example, in embodiments with N sets of permanent magnets installed periodically along the direction S with the spatial period Au and again with four beams 10, 20, 30, 40:

- FIG. 12 is a generalization for N=6 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet; thus, the structure for N=6 comprises the sets of magnets referenced 1, 2, 3, 4 of the case N=4, plus two sets of additional magnets referenced 5 and 6. Thus, each spatial period Au comprises the sets 1, 5, 2, 3, 6, 4 in this order along the direction S;
- FIG. 13 is a generalization for N=8 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet; thus, the structure for N=8 comprises the sets of magnets referenced 1, 2, 3, 4 of the case N=4, plus four sets of additional magnets referenced 7, 8, 9 and 13. Thus each spatial period Au comprises the sets 1, 7, 8, 2, 3, 9, 13, 4 in this order along the direction S;
- FIG. 14 is a generalization for N=10 sets of magnets, each magnet (corresponding to a single bottom beam 10 or 40) is represented by a rectangle with rounded corners and has a direction of its permanent magnetization vector, projected in the plane of this figure comprising the directions S and Z, shown by an arrow inside the rectangle of this magnet; thus, the structure for N=10 comprises the sets of magnets referenced 1, 2, 3, 4 of the case N=4, plus two sets of additional magnets referenced 5 and 6 of the case N=6, plus four sets of additional magnets referenced 7, 8, 9 and 13 of the case N=8. Thus, each spatial period Au comprises the sets 1, 7, 5, 8, 2, 3, 9, 6, 13, 4 in this order along the direction S.

The second embodiment of a magnet structure 200 according to the invention will now be described with reference to FIGS. 12 and 15 to 19, which will only be described for its differences relative to the first structure 100.

FIGS. 12 and 15 show a generalization to N=6 sets of magnets of the structure 100.

This structure 200 still comprises the four beams 10, 20, 30, 40.

The number N of sets is equal to 6.

Compared to the structure 100, the sets of magnets of the structure 200 further comprise:

- A fifth set 5 between the first set 1 and the second set 2
- A sixth set 6 between the third set 3 and the fourth set 4 so that the sets comprising the first, fifth, second, third, sixth and fourth successive sets are in this order along the direction S.

The magnetization vector of each magnet of the second beam and of the third beam has, in a projection in a plane comprising the directions Z and S, a direction that forms, with the direction Z:

- an angle of 0° for the fifth set
- an angle of 180° for the sixth set

The magnetization vector of each magnet of the first beam and of the fourth beam has, in a projection in a plane comprising the directions Z and S, a direction that forms, with the direction Z:

- an angle of 0° for the fifth set
- an angle of 180° for the sixth set

The magnetization vector of each magnet of the fifth set has, in a projection in a plane comprising the directions Z and X, a direction that forms, with the direction Z (as in FIG. 2):

- an angle of $-\theta_s$ for the first beam
- an angle of $\theta_s$ for the second beam
- an angle of $-\theta_s$ for the third beam
- an angle of $\theta_s$ for the fourth beam The magnetization vector of each magnet of the sixth set has, in a projection in a plane comprising the directions Z and X, a direction that forms, with the direction Z (as for FIG. 3):

- an angle of $-\theta_s-180°$ for the first beam
- an angle of $\theta_s-180°$ for the second beam
- an angle of $-\theta_s-180°$ for the third beam
- an angle of $\theta_s-180°$ for the fourth beam.

The directions of the magnetization vectors of the magnets of the sets 1, 23, 3 and 4 do not change relative to the structure 100.

Thus, for at least four successive sets of magnets of a spatial period Au, the magnetization vector of each magnet of each beam has a non-zero component along each of the directions X, S and Z.

FIGS. 16, 17, 18 and 19 respectively for N=6 of the structure 200 are the equivalent figures of FIGS. 7, 8, 9 and 10 respectively for N=4 of the structure 100.

Tables 2 and 3 for N=6 of the structure 200 are the equivalent tables of the tables respectively 1 and 2 for N=4 of the structure 100.

FIG. 16 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z=G_x$=G with a value variable between 1 mm and 51 mm
- Remanent field $B_r$ of 1.67 T.

FIG. 17 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- $\lambda_u$=40 mm
- $G_z=G_x$=G with a value variable between 1 mm and 51 mm
- Remanent field $B_r$ of 1.67 T.

Referring to FIGS. 16 and 17, it is noted that the ideal values of θs and $\theta_x$ for which the value of $B_z=B_x$ is maximum depend on G. Examples of these ideal values as a function of G are noted in the table below with the assumptions of FIGS. 16 and 17:

TABLE 3

| G (mm) | θx (°)(optimal values at +/−0.5°) | θs (°)(optimal values at +/−0.5°) |
|---|---|---|
| 1 | 64 | 34 |
| 4 | 62 | 34 |
| 7 | 56 | 36 |
| 10 | 54 | 36 |
| 16 | 46 | 38 |
| 21 | 42 | 40 |
| 26 | 38 | 40 |
| 36 | 34 | 42 |
| 50 | 28 | 42 |

It is noted that θs for N=6 is virtually similar to the structure with 4 magnets for N=4.

FIG. 18 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension $\lambda_u$/N mm along the S axis
- $\lambda_u$ variable from 20 to 70 mm
- $G_z$=$G_x$=G=1 mm
- Remanent field $B_r$ of 1.67 T.

FIG. 19 is obtained by digital simulation by means of a magnetic field simulation software (RADIA) that calculates the magnetic field generated by a permanent magnet or a sequencing of permanent magnets with the following assumptions:

- magnets of transverse dimensions 35 mm×35 mm along the X and Z axes and of dimension Au/N mm along the S axis
- Au variable from 20 to 70 mm
- $G_z$=$G_x$=G=1 mm
- Remanent field $B_r$ of 1.67 T.

Thus, with reference to FIGS. 18 and 19, it is noted that the ideal values of $\theta_x$ for which the value of $B_z$=$B_x$ is maximum depend on Au. Examples of these ideal values as a function of Au are noted in the table below with the assumptions of FIGS. 18 and 19:

TABLE 4

| Period $\lambda_u$ (mm) | θx (°)(optimal values at +/−0.5°) | θs (°)(optimal values at +/−0.5°) |
|---|---|---|
| 20 | 54 | 34 |
| 25 | 60 | 34 |
| 30 | 62 | 34 |
| 35 | 64 | 34 |
| 40 | 64 | 34 |
| 45 | 66 | 34 |
| 50 | 68 | 34 |
| 55 | 68 | 34 |
| 60 | 70 | 34 |
| 65 | 72 | 34 |
| 70 | 72 | 34 |

For N=6, it is noted that θs is constant whatever the value of the period $\lambda_u$ in the explored interval.

$\theta_x$ is typically within the interval ]5°; 80°], preferably in the interval [28°; 72°].

$\theta_s$ is typically within the interval ]5°; 43°[, preferably in the interval [34°; 42°].

Empirically, it was determined by interpolation that the optimum value of $\theta_s$ expressed in ° (for which $B_x$=$B_z$ and is maximum) is equal to:

$$\theta_S(G;\lambda_u) = Offset3 + AGap3 * \exp(BGap3 * G) + APeriod3 * \exp(BPeriod3 * \lambda_u) \text{ to within} \pm 7\%, \text{ perferably to within} \pm 3\%,$$

where:

$$Off3 = 37.222 \pm 0.201$$
$$AGap3 = -9.6508 \pm 0.0384$$
$$BGap3 = -0.038257 \pm 0.000448$$
$$APeriod3 = 12.099 \pm 0.13$$
$$BPeriod3 = -0.1507 \pm 0.000503$$

In this formula, G is expressed in mm and Au is expressed in mm.

Empirically, it was determined by interpolation that the optimum value of $\theta_x$ expressed in ° (for which $B_x$=$B_z$ and is maximum) is equal to:

$$\theta_x(G;\lambda_u) = Offset4 + AGap4 * \exp(BGap4 * G) + APeriod4 * \exp(BPeriod4 * \lambda_u) \text{ to within} \pm 4\%, \text{ perferably to within} \pm 3\%,$$

where:

$$Off4 = 49.848 \pm 0.3$$
$$AGap4 = 41.206 \pm 0.0801$$
$$BGap4 = -0.038149 \pm 0.000217$$
$$APeriod4 = -54.559 \pm 0.148$$
$$BPeriod4 = -0.018134 \pm 0.000223$$

In this formula, G is expressed in mm and Au is expressed in mm.

Of course, the invention is not limited to the examples just described, and many adjustments can be made to these examples without going beyond the scope of the invention.

Of course, the various features, forms, variants and embodiments of the invention may be combined with each other in various combinations as long as they are not incompatible or exclusive of each other. In particular, all the variants and embodiments described above can be combined with each other.

The invention claimed is:

1. A magnet structure comprising a number N of sets of permanent magnets installed periodically along a direction S with a spatial period $\lambda_u$ wherein N is greater than or equal to four, each set comprising:

a magnet of a first beam;

a magnet of a second beam;

a magnet of a third beam; and a magnet of a fourth beam;

the magnets of each beam being arranged in succession in the direction S, the first beam and the second beam being arranged in succession in a direction Z perpendicular to the direction S;

the fourth beam and the third beam being arranged in succession in the direction Z;

the third beam and the second beam being arranged in succession in a direction X perpendicular to the directions S and Z;

the fourth beam and the first beam being arranged in succession in the direction X; and for at least four successive sets of magnets of a spatial period $\lambda_u$, the magnetization vector of each magnet of each beam has a non-zero component along each of the directions X, S and Z.

2. The magnet structure according to claim 1, characterized in that the sets comprise a first, second, third and fourth successive sets in this order, and in that:

the magnetization vector of each magnet of the second beam and of the third beam has, in a projection in a plane comprising the directions Z and S, a direction that forms, with the direction Z:

an angle of $-\theta_x$ for the first set;

an angle of $+\theta_x$ for the second set;

an angle of $-\theta_x-180°$ for the third set; and an angle of $\theta_x-180°$ for the fourth set;

the magnetization vector of each magnet of the first beam and the fourth beam has, in a projection in a plane comprising the directions Z and S, a direction that forms, with the direction Z:

an angle of $\theta_x$ for the first set;

an angle of $-\theta_x$ for the second set;

an angle of $\theta_x-180°$ for the third set; and an angle of $-\theta_x-180°$ for the fourth set;

the magnetization vector of each magnet of the first set and the second set has, in a projection in a plane comprising the directions Z and X, a direction that forms, with the direction Z:

an angle of $-\theta_s$ for the first beam;

an angle of $\theta_s$ for the second beam;

an angle of $-\theta_s$ for the third beam; and an angle of $\theta_s$ for the fourth beam;

the magnetization vector of each magnet of the third set and the fourth set has, in a projection in a plane comprising the directions Z and X, a direction that forms, with the direction Z:

an angle of $-\theta_s-180°$ for the first beam;

an angle of $\theta_s-180°$ for the second beam;

an angle of $-\theta_s-180°$ for the third beam; and an angle of $\theta_s-180°$ for the fourth beam.

3. The magnet structure according to claim 2, characterized in that $\theta_x$ is different from 0°, 90°, 180° or 270°.

4. The magnet structure according to claim 2, characterized in that $\theta_x$ is comprised in the interval ]5°; 80°].

5. The magnet structure according to claim 2, characterized in that $\theta_s$ is different from 0°, 90°, 180° or 270°.

6. The magnet structure according to claim 2, characterized in that $\theta_s$ is different from 45°, 135°, 225° or 315°.

7. The magnet structure according to claim 2, characterized in that $\theta_s$ is comprised in the interval ]5°; 43°[.

8. The magnet structure according to claim 2, characterized in that the number N of sets is equal to 4.

9. The magnet structure according to claim 2, characterized in that the number N of sets is equal to 6, and in that the sets further comprise:

a fifth set between the first and the second set; and a sixth set between the third and fourth sets;

so that the sets comprise the first, fifth, second, third, sixth and fourth successive sets in this order, and in that:

the magnetization vector of each magnet of the second beam and of the third beam has, in a projection in a plane comprising the directions Z and S, a direction that forms, with the direction Z:

an angle of 0° for the fifth set; and an angle of 180° for the sixth set;

the magnetization vector of each magnet of the first beam and the fourth beam has, in a projection in a plane comprising the directions Z and S, a direction that forms, with the direction Z:

an angle of 0° for the fifth set;

an angle of 180° for the sixth set; and the magnetization vector of each magnet of the fifth set has, in a projection in a plane comprising the directions Z and X, a direction that forms, with the direction Z:

an angle of $-\theta_s$ for the first beam;

an angle of $\theta_s$ for the second beam;

an angle of $-\theta_s$ for the third beam; and an angle of $\theta_s$ for the fourth beam;

the magnetization vector of each magnet of the sixth set has, in a projection in a plane comprising the directions Z and X, a direction that forms, with the direction Z:

an angle of $-\theta_s-180°$ for the first beam;

an angle of $\theta_s-180°$ for the second beam;

an angle of $-\theta_s-180°$ for the third beam; and an angle of $\theta_s-180°$ for the fourth beam.

10. The magnet structure according to claim 1, characterized in that $\lambda_u$ is comprised in the interval [15 mm; 200 mm].

11. The magnet structure according to claim 1, characterized in that:

the first beam and the second beam are separated by a distance $G_z$ along the Z direction, the fourth beam and the third beam are separated by the distance $G_z$ along the Z direction, the third beam and the second beam are separated by a distance $G_x$ along the X direction, and the fourth beam and the first beam are separated by the distance $G_x$ along the X direction.

12. The magnet structure according to claim 11, characterized in that Gx is comprised in the interval [1 mm; 250 mm].

13. The magnet structure according to claim 11, characterized in that $G_x$ is equal, or substantially equal, to ±500 µm, subsequently denoted G.

14. The magnet structure according to claim 13, wherein the number N of sets is equal to 4, and characterized in that $\theta_x$ is equal to:

$$\theta_x(G;\lambda_u) = Offset1 + AGap1*\exp(BGap1*G) + APeriod1*\exp(BPeriod1*\lambda_u) \text{ to within} \pm 10\%, \text{ perferably to within} \pm 5\%$$

where:

$$Offset1 = 33.634 \pm 0.17,$$

$$AGap1 = 29.434 \pm 0.109,$$

$$BGap1 = -0.041763 \pm 0.000374,$$

$$APeriod1 = -39.534 \pm 0.104, \text{ and}$$

$$BPeriod1 = -0.027176 \pm 0.000263.$$

15. The magnet structure according to claim 13, wherein the number N of sets is equal to 4, and characterized in that $\theta_s$ is equal to:

$$\theta_S(G;\lambda_u) = Offset2 + AGap2 * \exp(BGap2 * G) + APeriod2 * \exp(BPeriod2 * \lambda_u) \text{ to within} \pm 5\%, \text{ perferably to within} \pm 2\%,$$

$$Offset2 = 35.233 \pm 0.147,$$

$$AGap2 = -10.382 \pm 0.0218,$$

$$BGap2 = -0.066698 \pm 0.000476,$$

$$APeriod2 = 13.866 \pm 0.0918, \text{ and}$$

$$BPeriod2 = -0.015736 \pm 0.000349.$$

16. The magnet structure according to claim 13, characterized in that $\theta_x$ is equal to:

$$\theta_x(G;\lambda_u) = Offset4 + AGap4 * \exp(BGap4 * G) + APeriod4 * \exp(BPeriod4 * \lambda_u) \text{ to within} \pm 4\%, \text{ perferably to within} \pm 3\%,$$

where:

$$Off4 = 49.848 \pm 0.3,$$

$$AGap4 = 41.206 \pm 0.0801,$$

$$BGap4 = -0.038149 \pm 0.000217,$$

$$APeriod4 = -54.559 \pm 0.148, \text{ and}$$

$$BPeriod4 = -0.018134 \pm 0.000223.$$

17. The magnet structure according to claim 13, characterized in that $\theta_s$ is equal to:

$$\theta_S(G;\lambda_u) = Offset3 + AGap3 * \exp(BGap3 * G) + APeriod3 * \exp(BPeriod3 * \lambda_u) \text{ to within} \pm 7\%, \text{ perferably to within} \pm 3\%,$$

where:

$$Off3 = 37.222 \pm 0.201,$$

$$AGap3 = -9.6508 \pm 0.0384,$$

$$BGap3 = -0.038257 \pm 0.000448,$$

$$APeriod3 = 12.099 \pm 0.13, \text{ and}$$

$$BPeriod3 = -0.1507 \pm 0.000503.$$

18. The magnet structure according to claim 1, characterized in that it is arranged to generate a magnetic field with its component along the direction Z equal, or substantially equal, to ±5%, to its component along the direction X.

19. An undulator comprising:

a magnet structure according to claim 1, a vacuum chamber arranged around or inside the magnet structure among the four beams.

20. A method for generating a magnetic field, characterized in that it is generated by means of a magnet structure according to claim 1.

21. The method according to claim 20, characterized in that the magnetic field is generated with its component along the direction Z equal, or substantially equal, to ±5%, to its component along the direction X.

* * * * *